United States Patent
Ricci et al.

(10) Patent No.: US 11,040,252 B2
(45) Date of Patent: Jun. 22, 2021

(54) METHOD FOR FORMING POLYURETHANE COVERS FOR GOLF BALLS USING FOAM COMPOSITIONS

(71) Applicant: Acushnet Company, Fairhaven, MA (US)

(72) Inventors: Shawn Ricci, New Bedford, MA (US); Mark L. Binette, Mattapoisett, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 16/449,655

(22) Filed: Jun. 24, 2019

(65) Prior Publication Data

US 2019/0308074 A1 Oct. 10, 2019

Related U.S. Application Data

(63) Continuation-in-part of application No. 16/220,016, filed on Dec. 14, 2018, now Pat. No. 10,413,782, (Continued)

(51) Int. Cl.
*A63B 37/06* (2006.01)
*A63B 37/00* (2006.01)
(Continued)

(52) U.S. Cl.
CPC ...... *A63B 37/0056* (2013.01); *A63B 37/0039* (2013.01); *A63B 37/0043* (2013.01); *A63B 37/0044* (2013.01); *A63B 37/0045* (2013.01); *A63B 37/0047* (2013.01); *A63B 37/0051* (2013.01); *A63B 37/0058* (2013.01); *A63B 37/0062* (2013.01); *A63B 37/0063* (2013.01); *A63B 37/0064* (2013.01); *A63B 37/0066* (2013.01); *A63B 37/0075* (2013.01); *A63B 37/0076* (2013.01); *A63B 37/0078* (2013.01); *A63B 37/0091* (2013.01); *A63B 37/0092* (2013.01); *A63B 37/0094* (2013.01); *C08G 18/10* (2013.01); *C08G 18/42* (2013.01); *C08G 18/44* (2013.01); *C08G 18/48* (2013.01); *C08G 18/6204* (2013.01); *A63B 45/00* (2013.01); *C08G 2101/00* (2013.01); *C08G 2110/0083* (2021.01)

(58) Field of Classification Search
CPC ........................ A63B 45/00; A63B 37/0023
USPC .................................................. 473/409, 378
See application file for complete search history.

(56) References Cited

U.S. PATENT DOCUMENTS 4,836,552 A 6/1989 Pucket et al.
4,839,116 A 6/1989 Puckett et al.
(Continued)

*Primary Examiner* — Raeann Gorden
(74) *Attorney, Agent, or Firm* — Mandi B. Milbank

(57) ABSTRACT

The present invention provides methods for producing molded golf balls and the resultant balls. The methods of this invention involve producing foamed polyurethane covers and these methods help reduce dimple distortions and other surface imperfections. These golf balls contain an inner core and outer foamed polyurethane cover. One or more intermediate layers can be disposed between the core and cover. In one embodiment, a castable liquid polyurethane composition containing a foaming agent is dispensed into mold cavities, which are then pressed together to form a foam cover for the ball.

10 Claims, 4 Drawing Sheets

Related U.S. Application Data which is a continuation of application No. 14/982,677, filed on Dec. 29, 2015, now abandoned.

(51) Int. Cl.
*C08G 18/48* (2006.01)
*C08G 18/44* (2006.01)
*C08G 18/42* (2006.01)
*C08G 18/10* (2006.01)
*C08G 18/62* (2006.01)
*A63B 45/00* (2006.01)
*C08G 101/00* (2006.01)

(56) References Cited

U.S. PATENT DOCUMENTS

| | | |
|---|---|---|
| 5,104,126 A | 4/1992 | Gentiluomo |
| 5,253,871 A | 10/1993 | Viollaz |
| 5,439,227 A | 8/1995 | Egashira et al. |
| 5,482,285 A | 1/1996 | Yabuki et al. |
| 5,556,098 A | 9/1996 | Higuchi et al. |
| 5,688,192 A | 11/1997 | Aoyama |
| 5,688,595 A | 11/1997 | Yamagishi et al. |
| 5,725,442 A | 3/1998 | Higuchi et al. |
| 5,823,889 A | 10/1998 | Aoyama |
| 5,833,553 A | 11/1998 | Sullivan et al. |
| 6,057,403 A | 5/2000 | Sullivan et al. |
| 6,213,895 B1 | 4/2001 | Sullivan et al. |
| 6,245,859 B1 | 6/2001 | Sullivan et al. |
| 6,386,992 B1 | 5/2002 | Harris et al. |
| 6,390,935 B1 | 5/2002 | Sugimoto |
| 6,431,999 B1 | 8/2002 | Nesbitt |
| 6,494,795 B2 | 12/2002 | Sullivan |
| 6,520,872 B2 | 2/2003 | Endo et al. |
| 6,634,962 B2 | 10/2003 | Sullivan |
| 6,688,991 B2 | 2/2004 | Sullivan et al. |
| 6,692,380 B2 | 2/2004 | Sullivan et al. |
| 6,743,123 B2 | 6/2004 | Sullivan |
| 6,767,294 B2 | 7/2004 | Nesbitt |
| 6,852,042 B2 | 2/2005 | Sullivan et al. |
| 6,939,249 B2 | 9/2005 | Sullivan |
| 6,995,191 B2 | 2/2006 | Sullivan et al. |
| 7,147,578 B2 | 12/2006 | Nesbitt et al. |
| 7,160,208 B2 | 1/2007 | Watanabe |
| 7,255,656 B2 | 8/2007 | Sullivan et al. |
| 7,371,192 B2 | 5/2008 | Sullivan et al. |
| 7,452,291 B2 | 11/2008 | Sullivan et al. |
| 7,708,654 B2 | 5/2010 | Sullivan et al. |
| 7,785,216 B2 | 8/2010 | Hebert et al. |
| 7,935,004 B2 | 5/2011 | Dalton et al. |
| 8,272,971 B2 | 9/2012 | Tutmark |
| 2004/0198535 A1* | 10/2004 | Cavallaro .......... A63B 37/0075 473/371 |
| 2005/0261084 A1* | 11/2005 | Sullivan ............ A63B 37/0003 473/354 |
| 2014/0357409 A1* | 12/2014 | Ichinose ........... A63B 37/0047 473/374 |
| 2015/0283432 A1* | 10/2015 | Sullivan ............ A63B 37/0063 473/373 |

\* cited by examiner

METHOD FOR FORMING POLYURETHANE COVERS FOR GOLF BALLS USING FOAM COMPOSITIONS

CROSS-REFERENCE TO RELATED APPLICATIONS

This application is a continuation-in-part of co-pending, co-assigned U.S. patent application Ser. No. 16/220,016 having a filing date of Dec. 14, 2016, now allowed, which is a continuation of co-assigned U.S. patent application Ser. No. 14/982,677 having a filing date of Dec. 29, 2015, now abandoned, the entire disclosures of which are hereby incorporated by reference.

BACKGROUND OF THE INVENTION

Field of the Invention

The present invention is directed generally to methods for producing multi-piece solid golf balls. In general, such balls contain an inner core and outer cover with one or more intermediate layers disposed between the core and cover. A liquid polyurethane composition containing a foaming agent is dispensed into mold cavities, which are then pressed together to form a spherical cover for the ball. The interior surfaces of the mold cavities define a specific dimple pattern for the surface of the ball.

Brief Review of the Related Art

Manufacturers produce golf balls having a wide variety of dimple patterns. Different dimple shapes, sizes, and geometric patterns are used to modify aerodynamic properties of the ball. The dimples affect the lift, drag, and flight stability of the ball. When a golf ball is struck efficiently with the club face, it will spin about a horizontal axis and the interaction between the dimples and oncoming air stream will produce the desired lift, drag, and stability. Various dimple patterns are used to create a ball that can travel long distances and have good flight trajectory when struck by a club.

Forming the dimpled cover layers for golf balls involves several steps. Mold cavities having select dimple profiles are used to manufacture the balls. The mold cavities have slight protrusions machined into their interior surfaces and these peaks/valleys form the dimple pattern on the surface of the ball. In large scale production operations, thousands of balls are produced daily. It is important the dimples be formed consistently on the ball surfaces. The dimensions and geometries of the dimples must be identical for each ball being produced on a given assembly line. In turn, the dimple profiles of the mold cavities used to produce these balls must be precisely detailed and accurate.

Castable polymer materials such as polyurethanes or polyureas can be used to form the dimpled cover layers. These materials are dispensed into the mold cavities and the cavities are clamped together to form the dimpled cover. For example, Hebert et al., U.S. Pat. No. 6,132,324 discloses a method of forming a multi-layered golf ball comprising a core, inner cover layer, and outer cover layer. The core of the golf ball is formed and then an inner cover is injection-molded over the core to form a golf ball subassembly (core and inner cover). Two mold cavities are used, an upper mold cavity and lower mold cavity. Each mold cavity is approximately one-half of the size of a finished ball. The mold cavities have interior walls with details defining the dimple pattern of the resulting ball. A castable polyurethane material is introduced into the mold cavities and then the ball subassembly is placed in one cavity.

Next, the upper and lower mold cavities are joined together under sufficient heat and pressure to form an internal spherical-shaped cavity. The polyurethane material in the cavities encapsulates the ball subassembly and forms the cover of the ball. As noted above, the mold cavities, which are pressed together, contain slight protrusions representing the negative image of the dimple pattern that will be produced on the finished ball. The mold cavities are held together until the polyurethane cover material is cooled, and then the cavities are opened to remove the ball.

During this casting method, dimple distortions can occur in the polyurethane cover. Different molding conditions can cause these defects. For example, there can be insufficient cavity pressure during the manufacturing process and this can cause the composition to only partially "pack-out" the dimple pattern in the mold cavities. The dimple profile is not fully packed-out. In some cases, cavity pressure can be increased by increasing the mold temperature during curing and using cooler core temperatures, but there are drawbacks with both of these approaches. For example, heating the molds to excessively high temperatures can cause melting of the underlying layer made of ethylene acid copolymer ionomer resin. Using excessively cool cores can lead to balls that are difficult to remove from molds.

Another problem is molding flash which occurs when the golf ball is removed from the hemispherical molds. The molding flash will be located at the parting line of the molds. The molding flash will therefore be on the "equator" of the golf ball. It would be desirable to have new manufacturing methods that reduces the amount (weight) of flash and reduces dimple distortions and other surface imperfections on the cover of the ball.

The present invention provides new methods for producing golf balls and the resultant balls. The methods of this invention involve producing molded polyurethane covers and these methods help reduce dimple distortions and other surface imperfections. The resulting golf balls have improved high resiliency and a soft feel as well as other advantageous properties, features, and benefits.

SUMMARY OF THE INVENTION

The present invention provides a golf ball comprising: i) a core having at least one layer; ii) an inner cover layer comprising a non-foamed thermoplastic composition, the inner cover layer being disposed about the core and having a Shore D midpoint hardness in the range of about 55 to about 75; and iii) an outer cover layer comprising a foamed polyurethane composition disposed about the inner cover layer and having a Shore D outer surface hardness in the range of about 15 to about 60, wherein the outer surface hardness of the outer cover is less than the midpoint hardness of the inner cover.

Preferably, the non-foamed thermoplastic composition comprises: a) an acid copolymer of ethylene and an $\alpha,\beta$-unsaturated carboxylic acid, optionally including a softening monomer selected from the group consisting of alkyl acrylates and methacrylates; and b) a cation source present in an amount sufficient to neutralize from about 1 to about 100% of all acid groups present in the composition. In one embodiment, the core is single-layered and made of polybutadiene. The outer cover preferably has a thickness in the range of about 0.010 to about 0.050 inches and a hardness in the range of about 20 to about 50 Shore D.

The foamed polyurethane composition preferably comprises clay particulate. The clay particulate can contain a mixture of different clay particles having an average specific gravity in the range of about 1.30 to about 3.00. The clay particulate can have a chemically-modified surface, the surface being chemically-modified with a compound selected from the group consisting of ammonium compounds, protonated amines, organic phosphonium ions, and/or aminocarboxylic acids. The foamed polyurethane outer cover the golf ball of this invention preferably has a specific gravity in the range of about 0.90 to about 1.20 and more preferably in the range of about 0.95 to about 1.15.

The method of this invention involves charging a foamable polyurethane composition to a mold to form a golf ball cover. In one embodiment, the foaming mold method comprises the steps of: i) providing a spherical core having at least one layer; ii) providing an upper and lower mold cavity, each mold cavity having an arcuate inner surface defining an inverted dimple pattern; iii) introducing a polyurethane composition comprising a foaming agent into at least one mold cavity and loading the core into a mold cavity; iv) joining the mold cavities together under compressive force and heating the polyurethane composition so that the foaming agent is activated and foaming of the composition is initiated and a spherical foamed polyurethane cover layer is formed over the core; and v) detaching the mold cavities and removing the ball.

In one preferred embodiment, the foaming agent is water. The foamed polyurethane composition can be prepared by adding water to a mixture of polyisocyanate, polyol, and curing agent compounds, wherein the water is added in a sufficient amount to cause the mixture to foam. Preferably the polyurethane composition contains a catalyst and clay particulate as discussed above. The foamed polyurethane outer cover produced by this method preferably has a specific gravity in the range of about 0.90 to about 1.20 and more preferably in the range of about 0.95 to about 1.15.

The methods of this invention produce foamed polyurethane covers by packing-out the dimples of the mold cavities. These methods help reduce dimple distortions and other surface imperfections on the cover surface of the golf ball. The dimple packing-out foaming methods of the present invention can produce significant cost savings over non-foaming methods. Furthermore, there is less waste produced in the dimple packing-out foaming methods of the present invention.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings, in which:

DETAILED DESCRIPTION OF THE INVENTION

The present invention relates generally to new methods for producing golf balls having a cover layer, particularly polyurethane cover layers. These methods help reduce dimple distortions and other surface imperfections. The resulting golf balls have improved high resiliency and a soft feel.

Figure 1:
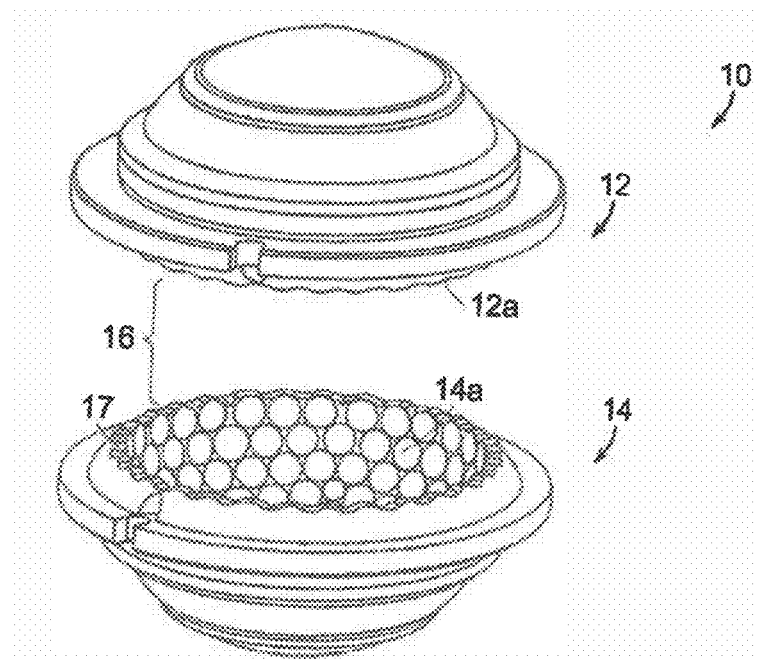
FIG. 1 is a perspective view of upper and lower mold cavities of the prior art.
Figure 2:
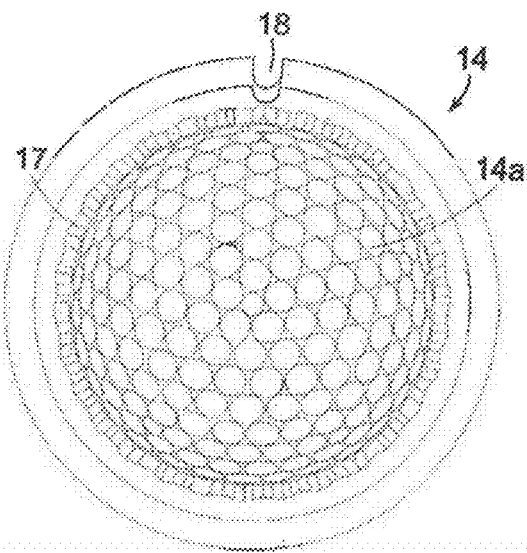
FIG. 2 is a planar view of the lower mold cavity shown in FIG. 1.

Referring to the Figures, where like reference numerals are used to designate like elements, and particularly FIG. 1, a golf ball mold (10) used to form a traditional cover layer over a core (or ball subassembly) is generally shown. The mold (10) includes hemispherical mold cavities (12) and (14) having interior dimple patterns (12a) and (14a). When the mold cavities (12, 14) are mated, they define an interior spherical cavity (16) to form the cover for the ball. The mold cavities (12, 14) are mated together along a parting line (17) that creates an equator or seam for the finished ball. In recent years, mold cavities with non-planar mating surfaces have been used to create a golf balls having a staggered parting line. For example, Nardacci et al., U.S. Pat. No. 7,618,333 discloses a method for making golf balls having a staggered parting line. The upper and lower mold cavities have non-planar mating surfaces. When the cavities are mated, the parting line follows the dimple outline pattern and allows the dimple outline pattern of one mold cavity to interdigitate with the dimple outline pattern of the mating mold cavity, thereby forming a golf ball without an obvious parting line. In FIG. 2, the mold cavity (14) is shown in further detail. The mold cavity (14) includes a dimple pattern (14a) and locator slot (18) that fits over a locator pin on a mold frame (not shown) when the mold cavity (14) is inserted into the frame.

Polyurethane Composition

The golf balls of this invention include an outer cover layer preferably made of a thermoplastic polyurethane composition. In general, polyurethanes contain urethane linkages formed by reacting an isocyanate group (—N=C=O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units, because they can be polymerized to produce polymeric isocyanates containing two or more monomeric isocyanate repeat units. The isocyanate compound may have any suitable backbone chain structure including saturated or unsaturated, and linear, branched, or cyclic. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. By the term, "polyol" as used herein, it is meant any aliphatic or aromatic compound containing two or more hydroxyl functional groups. The term "polyol" may be used interchangeably with hydroxy-terminated component.

Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the theremoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Aromatic polyurethanes can be prepared in accordance with this invention and these materials are preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and cut/shear-resistance.

Aliphatic polyurethanes also can be prepared in accordance with this invention and these materials are preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. Particularly suitable multi-functional isocyanates include trimers of HDI or $H_{12}$ MDI, oligomers, or other derivatives thereof. The resulting polyurethane generally has good light and thermal stability.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG) which is particularly preferred, polyethylene propylene glycol, polyoxypropylene glycol, and mixtures thereof. The hydrocarbon chain can have saturated or unsaturated bonds and substituted or unsubstituted aromatic and cyclic groups.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single chain-extender or blend of chain-extenders as described further below. As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. In general, thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio A catalyst may be employed to promote the reaction between the isocyanate and polyol compounds for producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenyl-methane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. One particularly suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

More particularly, when the polyurethane prepolymer is reacted with hydroxyl-terminated curing agents during the chain-extending step, as described above, the resulting composition is essentially a pure polyurethane composition containing urethane linkages having the following general structure:

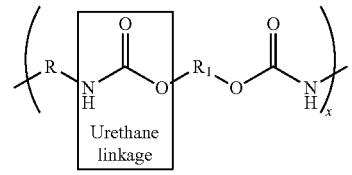

where x is the chain length, i.e., about 1 or greater, and R and $R_1$ are straight chain or branched hydrocarbon chain having about 1 to about 20 carbons.

However, when the polyurethane prepolymer is reacted with an amine-terminated curing agent during the chain-extending step, any excess isocyanate groups in the prepolymer will react with the amine groups in the curing agent and create urea linkages having the following general structure:

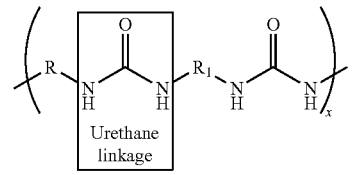

where x is the chain length, i.e., about 1 or greater, and R and $R_1$ are straight chain or branched hydrocarbon chain having about 1 to about 20 carbons.

The polyurethane compositions used to form the cover layer may contain other polymer materials including, for example: aliphatic or aromatic polyurethanes, aliphatic or aromatic polyureas, aliphatic or aromatic polyurethane/urea hybrids, olefin-based copolymer ionomer compositions, polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, available from Arkema Inc; cross-linked trans-polyisoprene and blends thereof; polyester-based thermoplastic elastomers, such as Hytrel®, available from DuPont; polyurethane-based thermoplastic elastomers, such as Elastollan®, available from BASF; polycarbonate/polyester blends such as Xylex®, available from SABIC Innovative Plastics; maleic anhydride-grafted polymers such as Fusabond®, available from DuPont; and mixtures of the foregoing materials.

In addition, the polyurethane compositions may contain fillers, additives, and other ingredients that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Rubber regrind (recycled core material) and polymeric, ceramic, metal, and glass microspheres also may be used. Generally, the additives will be present in the composition in an amount between about 1 and about 70 weight percent based on total weight of the composition depending upon the desired properties.

Foaming Formulation

Preferably, the polyurethane formulation of this invention contains a foaming (blowing) agent so that the formulation may expand once the mold cavities have been clamped together. In this way, there is dimple pack-out. The level of foaming is kept to a minimum so that the physical properties of the polyurethane cover can be maintained. This dimple packing-out method can reduce dimple defects and minimize the weight of the flash ring. This dimple packing-out method can result in cost savings as described further below.

The foaming (blowing) agents used to form the foam are typically in the form of powder, pellets, or liquids and they are added to the composition, where they decompose or react during heating and generate gaseous by-products (for example, nitrogen or carbon dioxide). The gas is dispersed and trapped throughout the composition and foams it. For example, water may be used as the foaming agent. As discussed in more detail further below, the isocyanates react with the water to generate carbon dioxide which fills and expands the cells created during the mixing process.

The chemical foaming agents may be inorganic, such as ammonium carbonate and carbonates of alkalai metals, or may be organic, such as azo and diazo compounds. Suitable azo compounds include, but are not limited to, 2,2'-azobis (2-cyanobutane), 2,2'-azobis(methylbutyronitrile), and azodicarbonamide. Other compounds include, for example, p,p'-oxybis(benzene sulfonyl hydrazide), p-toluene sulfonyl semicarbazide, and p-toluene sulfonyl hydrazide. Other foaming agents include any of the Celogens® sold by Crompton Chemical Corporation, and nitroso compounds, sulfonylhydrazides, azides of organic acids and their analogs, triazines, tri- and tetrazole derivatives, sulfonyl semicarbazides, urea derivatives, guanidine derivatives, and esters such as alkoxyboroxines. Also, foaming agents that liberate gases as a result of chemical interaction between components such as mixtures of acids and metals, mixtures of organic acids and inorganic carbonates, mixtures of nitriles and ammonium salts, and the hydrolytic decomposition of urea may be used. In one embodiment of the present invention, the foam composition is formed from primary and secondary chemical foaming agents.

Primary Chemical Blowing Agents—

One or more primary chemical blowing agents are added to the formulation that will be foamed. Water is a preferred blowing agent. When added to the polyurethane formulation, water will react with the isocyanate groups and form carbamic acid intermediates. The carbamic acids readily decarboxylate to form an amine and carbon dioxide. The newly formed amine can then further react with other isocyanate groups to form urea linkages and the carbon dioxide forms the bubbles to produce the foam. The water is added in a sufficient amount to cause the mixture to foam. In one preferred embodiment, the water is present in the composition in an amount in the range of 0.25 to 3.0% by weight based on total weight of the composition.

Physical Blowing Agents—

The physical blowing agents are different materials and have different working mechanisms than the chemical blowing agents. The physical blowing agents may be used, in addition to or as an alternative to, the primary chemical blowing agents. These blowing agents typically are gasses that are introduced under high pressure directly into the polymer composition. Chlorofluorocarbons (CFCs) and partially halogenated chlorofluorocarbons are effective, but these compounds are banned in many countries because of their environmental side effects. Alternatively, aliphatic and cyclic hydrocarbon gasses such as isobutene and pentane may be used. Inert gasses, such as carbon dioxide and nitrogen, also are suitable. With physical blowing agents, the isocyanate and polyol compounds react to form polyurethane linkages and the reaction generates heat. Foam cells are generated and as the foaming agent vaporizes, the gas becomes trapped in the cells of the foam.

Secondary Chemical Blowing Agents—

In one embodiment of the present invention, one or more secondary chemical foaming (blowing) agents can be added to the polyurethane formulation that will be foamed. Thus, in one preferred version, the formulation contains a blend of primary and secondary foaming agents. The secondary foaming agents are not activated during initial molding of the polyurethane cover. Instead, these secondary foaming agents are activated during subsequent steps in the manufacturing process. For example, the polyurethane cover is often cured by heating in subsequent steps (post-curing). During these steps, the secondary foaming agents are activated to fully foam the cover composition. In another embodiment, retractable support pins extend into and support the inner core when it is in the mold cavities. When the support pins are retracted from the mold cavities after the initial molding of the polyurethane cover, there can be a heating step. The holes would be filled in by the secondary foaming. During this heating step, the secondary foaming agents are activated to fully foam the cover composition. In one preferred embodiment, the secondary foaming agent is present in the composition in an amount in the range of 0.1 to 5.0% by weight based on total weight of the composition, and more preferably in the range of 0.5 to 3.0%. Thus, in this embodiment, the foam composition is formed from primary and secondary chemical foaming agents.

As discussed above, one or more primary foaming agents can be added to the polyurethane cover formulation. Water is a preferred primary chemical foaming agent. When added to the polyurethane formulation, water will react with the isocyanate groups and form carbamic acid intermediates. The carbamic acids readily decarboxylate to form an amine and carbon dioxide. The newly formed amine can then further react with other isocyanate groups to form urea linkages and the carbon dioxide forms the bubbles to produce the foam. One or more secondary chemical foaming agents also can be added to the polyurethane cover formulation as discussed above.

The secondary foaming agents may be selected, for example, from the group consisting of azo compounds such as azodicarbonamide (ADCA) and azobisformamide; nitroso compounds such as N, N-dimethyl-N, N-dinitroso terephthalamide, N, N-dinitroso-pentamethylene-tetramine (DPT), and 5-Phenyltetrazole (5 PT); hydrazine derivatives such as 4, 4'-Oxybis(benzenesulfonylhydrazide) (OBSH), hydrazodicarbonamide (HDCA), toluenesulfonyl hydrazide (TSH), and benzene-sulfonyl-hydrazide (BSH), carbazide compounds such as toluenesulfonyl-semicarbazide (TSH); and hydrogen carbonates such as sodium hydrogen carbonate ($NaHCO_3$); and mixtures thereof. Thus, the formulation may contain a mixture of secondary foaming agents.

In one preferred embodiment, chemical foaming agents having relatively low decomposition temperatures that complement the heating temperatures in the molding cycle are used. These foaming agents will start to decompose as the designated temperature in the molding process, and the foaming reaction will proceed more quickly. It is recognized that during the decomposition reaction of certain chemical foaming agents, more heat and energy is released than is needed for the reaction. Once the decomposition has started, it continues for a relatively long time period. If these foaming agents are used, longer cooling periods are generally required. Hydrazide and azo-based compounds often are used as exothermic foaming agents. On the other hand, endothermic foaming agents need energy for decomposition. Thus, the release of the gasses quickly stops after the supply of heat to the composition has been terminated. If the composition is produced using these foaming agents, shorter cooling periods are needed. Bicarbonate and citric acid-based foaming agents can be used as exothermic foaming agents.

In the process of this invention, the materials used to prepare the foam are charged to the mold for producing the cover as discussed further below. The mold may be equipped with steam nozzles so that steam can be injected into the mold cavity. The temperature inside of the mold can vary, for example, the temperature can range from about 80° to about 400° F. Steam, hot air, hot water, or radiant heat may be used to foam the composition. The composition expands as it is heated. This causes dimple pack-out and can reduce defects in the dimple profile. The temperature must be chosen carefully and must be sufficiently high so that it activates the primary foaming agents and foams the mixture, but it must not be excessively high. The amount of foaming is minimized so that the physical properties of the cover can be maintained. In general, the temperature should be in the range of about room temperature (RT) to about 180° F. and preferably in the range of about room temperature (RT) to about 150° F. so that it activates the primary foaming agents. Once the polymer materials, foaming agent, and any optional ingredients (for example, fillers) are charged to the mold and treated with sufficient heat and pressure, the primary foaming agents are activated. This causes the polymer mixture to foam and form the primary heat-activated foam composition in the mold. In one embodiment, the primary heat-activated foam composition can further contain secondary foaming agents that are not activated during this initial molding step. Rather, these secondary foaming agents are activated in subsequent steps as discussed above.

Molding Method

The cover may be formed around the golf ball sub-assembly by dispensing polymeric material into the mold cavities and mating them together under sufficient heat and pressure. By the term, "sub-assembly" as used herein, it is meant the inner ball, that is the core and any intermediate layer(s) disposed between the core and outer cover layer. The core and intermediate layers are described in further detail below.

As discussed above, in the present invention, preferably a polyurethane composition is used to form the outer cover of the golf ball. The polyurethane composition is in generally liquid form so that it can be dispensed into the mold cavities and molded over the golf ball sub-assembly. The molding process of this invention is suitable for making thin outer cover layers. Particularly, covers having a thickness of less than 0.05 inches can be made, more preferably in the range of 0.015 to 0.045 inches. Castable polyurethanes, polyureas, and copolymers, hybrids, and mixtures of polyurethanes-polyureas are of particular interest, because these materials can be used to make a golf ball having high resiliency and a soft feel.

However, it is recognized that materials, other than polyurethanes, can be used to form the cover layer in accordance with the present invention. For example, olefin-based copolymer ionomer resins (for example, Surlyn® ionomer resins and DuPont HPF® 1000 and HPF® 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof.

In one embodiment, a polyurethane prepolymer and curing agent can be mixed in a motorized mixer inside a mixing head by metering amounts of the curative and prepolymer through the feed lines. The preheated lower mold cavities can be filled with the reactive polyurethane and curing agent mixture. Likewise, the preheated upper mold cavities can be filled with the reactive mixture. The lower and upper mold cavities are filled with substantially the same amount of reactive mixture. After the reactive mixture has resided in the lower mold cavities for a sufficient time period, typically about 40 to about 100 seconds, the golf ball subassembly can be lowered at a controlled speed into the reacting mixture. Ball cups can hold the subassemblies by applying reduced pressure (or partial vacuum). After sufficient gelling (typically about 4 to about 12 seconds), the vacuum can be removed and the subassembly can be released. Then, the upper half-molds can be mated with the lower half-molds. An exothermic reaction occurs when the polyurethane prepolymer and curing agent are mixed and this continues until the material solidifies around the subassembly. The molded balls can then be cooled in the mold and removed when the molded cover layer is hard enough to be handled without deforming. This molding technique is described in the above-mentioned Hebert et al., U.S. Pat. No. 6,132,324 along with Wu, U.S. Pat. No. 5,334,673 and Brown et al., U.S. Pat. No. 5,006,297, the disclosures of which are hereby incorporated by reference.

Prior to forming the cover layer, the ball subassembly may be surface-treated to increase the adhesion between its outer surface and cover material. Examples of such surface-treatment may include mechanically or chemically abrading the outer surface of the subassembly. Additionally, the subassembly may be subjected to corona discharge, plasma treatment, silane dipping, or other chemical treatment methods known to those of ordinary skill in the art prior to forming the cover around it. Other layers of the ball, for example, the core and cover layers, also may be surface-treated. Examples of these and other surface-treatment techniques can be found in U.S. Pat. No. 6,315,915, the disclosure of which is hereby incorporated by reference.

A dispensing process as described in U.S. Pat. Nos. 7,655,171; 7,490,975; and 7,246,937, the disclosures of which are hereby incorporated by reference, can be used in accordance with the present invention. This process involves pumping the reactive polyurethane components into a mixer body and mixing them together with a dynamic mixer element. The components are heated to a temperature in the range of about 150° F. to about 350° F. as the components flow through a dispensing port, which dispenses the components into the lower and upper half-molds. The dispensing port moves into and out of the mold cavity by pneumatic pressure so the components are deposited uniformly into the half-molds.

In another embodiment, a conveyor belt system can be used for transporting the mold frames as described in co-assigned, co-pending, U.S. patent application Ser. No. 12/614,814, the disclosure of which is hereby incorporated by reference. In this system, the lower and upper frame plates containing the mold cavities are pre-heated to a temperature in the range of about 140° to about 165° F. Dispensing ports are used to inject the polyurethane mixture into the mold cavities. The upper mold frame plates containing the upper mold cavities are fed to a golf ball sub-assembly supply station, where the ball sub-assemblies are introduced into the cavities. The lower mold frame plates containing the lower mold cavities continue moving forward on the main conveyor belt line. At the next station, the upper and lower mold frame plates are fastened together.

At the assembly head station, the upper and lower frame plates are clamped together, preferably by bolts which are threaded through bores under pressure normally between about 400 to about 600 psi. After the mold frame is assembled, the frame is fed back to the main conveyor belt and carried to a curing tunnel.

Automated flippers grab the mold frames and reorient them so they stand in a vertical position prior to being introduced into the curing tunnel. This allows the system to maximize conveyor space and also achieve a higher degree of curing thermodynamics. The mold frames are then carried into the curing tunnel. Upon exiting the curing tunnel, the mold frames are pre-cooled on a meshed conveyor belt to allow directed air flow evenly over both upper and lower frame plates simultaneously. Then, the molds are fed into a tipping station, wherein they are reoriented to a horizontal position. The mold frames then are carried through a high efficiency chiller equipped with fans operated by zone control. After the mold frames have been chilled, the balls are de-molded by an automated in-line disassembly machine and then moved to a ball removal machine which automatically picks the golf balls out of the mold halves for further processing.

After the golf balls have been removed from the mold, they may be subjected to finishing steps such as flash trimming, surface-treatment, marking, coating, and the like using techniques known in the art.

Core and Intermediate Layers

As discussed above, the core and intermediate layer(s), if any are present, constitute the sub-assembly of the ball or inner ball which is encapsulated by the cover material. The core and intermediate layers may be made of a wide variety of thermoset and thermoplastic materials.

Preferably, the core is made of a thermoset rubber composition. Suitable thermoset rubber materials that may be used to form the inner core include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. More preferably, the inner core is formed from a polybutadiene rubber composition.

The thermoset rubber composition may be cured using conventional curing processes. Suitable curing processes include, for example, peroxide-curing, sulfur-curing, high-energy radiation, and combinations thereof. Radical scavengers such as a halogenated organosulfur, organic disulfide, or inorganic disulfide compounds may be added to the rubber composition. These compounds also may function as "soft and fast agents." The rubber composition also may include filler(s) such as materials selected from carbon black, clay and nanoclay particles, talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In addition, the rubber compositions may include antioxidants. Also, processing aids such as high molecular weight organic acids and salts thereof may be added to the composition. In another embodiment, foaming (blowing) agents, as discussed above, are added to the rubber composition and the rubber composition is foamed.

One or more intermediate layers can be molded over the inner core. These intermediate layers also can be referred to as outer core, casing, or inner cover layers. In one embodiment, as described above, the intermediate layer is made of a second thermoset rubber composition. Thus, a dual-layered core having a first layer made of a thermoset rubber and a second layer made of a thermoset rubber can be made. A cover composition can be molded over this ball sub-assembly in accordance with this invention. In another embodiment, a thermoplastic composition is used to form the intermediate layer. Thus, in this embodiment, a dual-layered core having a first layer made of a thermoset rubber and a second layer made of a thermoplastic composition is made.

Figure 3:
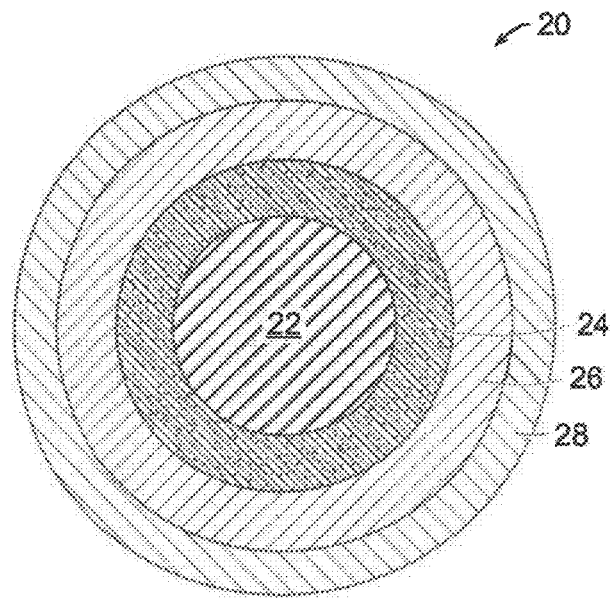
FIG. 3 is a cross-sectional view of a four-piece golf ball having a dual-layered core and surrounding cover made in accordance with the present invention.
Figure 4:
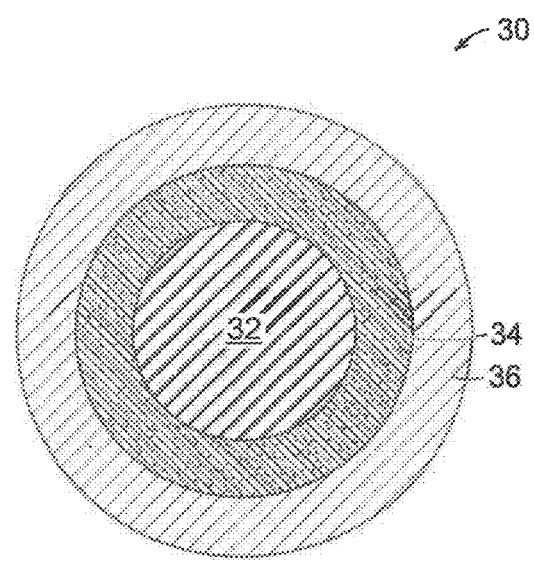
FIG. 4 is a cross-sectional view of a three-piece golf ball having a dual-layered core and surrounding cover made in accordance with the present invention.
Figure 5:
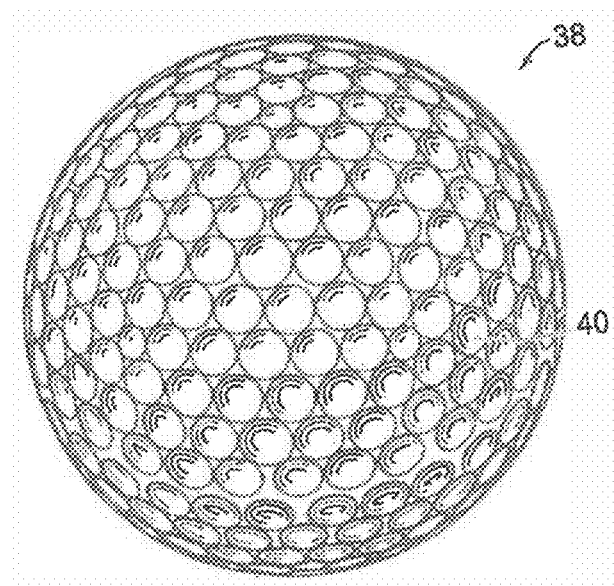
FIG. 5 is a perspective view of a finished golf ball having a dimpled cover made in accordance with the present invention.

Referring to FIG. 3, one version of a four-piece golf ball that can be made in accordance with this invention is generally indicated at (20). The ball (20) contains an inner core (center) (22) and surrounding intermediate layers (24) and (26), which also can be referred to as the outer core and inner cover layers, respectively. This ball sub-assembly is encapsulated by an outer cover (28) made in accordance with the molding methods of this invention. Referring to FIG. 5, in another version, a three-piece golf ball (30) contains an inner core (center) (32) and outer core layer (34). Thus, the core is dual-layered. This core sub-assembly is surrounded by a single-layered cover (36) made in accordance with the molding methods of this invention.

For example, the intermediate layer may be made from an ethylene acid copolymer ionomer composition. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. The composition used to make the intermediate layer can include additives, for example, fillers, cross-linking agents, chain extenders, surfactants, dyes and pigments, coloring agents, fluorescent agents, adsorbents, stabilizers, softening agents, impact modifiers, antioxidants, antiozonants, and the like. In another embodiment, foaming (blowing) agents, as discussed above, are added to the thermoplastic or thermoset composition used to make the inner cover layer, and the composition is foamed.

Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/isobutyl (meth)acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

Other suitable thermoplastic polymers that may be used to form the intermediate layer include, but are not limited to, the following polymers (including homopolymers, copolymers, and derivatives thereof); (a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

In another embodiment, the intermediate layer is disposed about the inner core, wherein at least one of the inner core and intermediate layer comprises a foamed composition. For example, the inner core can comprise a foamed composition. In another example, the intermediate layer can comprise a foamed composition. In yet another example, both the inner core and intermediate layers can comprise a foamed composition.

Foamed thermoset and thermoplastic compositions can be used to form the inner core and/or intermediate layer. For example, thermoset compositions such as, for example, polybutadiene rubber, can be used. Also, thermoplastic polymers can be used, for example those selected from the group consisting of partially-neutralized ethylene acid copolymer ionomers; highly-neutralized ethylene acid copolymer ionomers; polyesters; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

The intermediate layer also may be referred to as a casing, mantle, or inner cover layer. In one example, a golf ball having inner and outer cover layers may be made. The multi-layered cover of the golf balls of this invention provide the ball with good impact durability, toughness, and wear-resistance. In general, the hardness and thickness of the different cover layers may vary depending upon the desired ball construction.

In one example, the inner cover layer hardness is about 15 Shore D or greater, more preferably about 25 Shore D or greater, and most preferably about 35 Shore D or greater. For example, the inner cover layer hardness may be in the range of about 15 to about 60 Shore D, and more preferably about 27 to about 48 Shore D. In another version, the inner cover layer hardness is about 50 Shore D or greater, preferably about 55 Shore D or greater, and most preferably about 60 Shore D or greater. For example, in one version, the inner cover has a Shore D hardness of about 55 to about 90 Shore D. In another embodiment, the inner cover has a Shore D hardness of about 60 to about 78 Shore D, and in yet another version, the inner cover has a Shore D hardness of about 64 to about 72 Shore D. More particularly, in one example, the inner cover has a hardness of about 65 Shore D or greater. The hardness of the inner cover layer is measured per the methods described further below. In addition, the thickness of the inner cover layer is preferably about 0.015 inches to about 0.100 inches, more preferably about 0.020 inches to about 0.080 inches, and most preferably about 0.030 inches to about 0.050 inches. Typically, the thickness of the inner cover is about 0.035 or 0.040 or 0.045 inches.

Concerning the outer cover layer, this layer may be relatively thin. The outer cover preferably has a thickness within a range having a lower limit of 0.004 or 0.006 or 0.008 and an upper limit of 0.010 or 0.020 or 0.030 or 0.040 inches. Preferably, the thickness of the outer cover is about 0.016 inches or less, more preferably 0.008 inches or less. The outer cover preferably has a material hardness of 80 Shore D or less, or 70 Shore D or less, or 60 Shore D or less, or 55 Shore D or less, or 50 Shore D or less, or 45 Shore D or less. In one example, the outer cover preferably has a Shore D hardness in the range of about 50 to about 80, more preferably about 55 to about 75. In another example, the outer cover preferably has a Shore D hardness in the range of about 10 to about 70, more preferably about 15 to about 60. The hardness of the inner and outer cover layers may be measured per the methods described below.

The hardness of a cover layer may be measured on the surface or midpoint of the given layer in a manner similar to measuring the hardness of a core layer as described further below. For example, the hardness of the inner cover layer may be measured at the surface or midpoint of the layer. A midpoint hardness measurement is preferably made for the inner and intermediate cover layers. The midpoint hardness of a cover layer is taken at a point equidistant from the inner surface and outer surface of the layer to be measured. Once one or more cover or other ball layers surround a layer of interest, the exact midpoint may be difficult to determine, therefore, for the purposes of the present invention, the measurement of "midpoint" hardness of a layer is taken within plus or minus 1 mm of the measured midpoint of the layer. A surface hardness measurement is preferably made for the outer cover layer. In these instances, the hardness is measured on the outer surface (cover) of the ball. Methods for measuring the hardness are described in detail below under "Test Methods."

The different hardness and thickness levels of the cover layers provide the ball with high impact durability and cut-, shear- and tear-resistance levels. In addition, the multi-layered cover, in combination with the core layer, helps impart high resiliency to the golf balls. Preferably, the golf ball has a Coefficient of Restitution (CoR) of at least 0.750 and more preferably at least 0.800. The core of the golf ball generally has a compression in the range of about 20 to about 120 and more preferably in the range of about 50 to about 100. These properties allow players to generate greater ball velocity off the tee and achieve greater distance with their drives. At the same time, the cover layers provide a player with a more comfortable and natural feeling when striking the ball with a club. The ball is more playable and the ball's flight path can be controlled more easily.

The specific gravity (density) of the respective golf ball layers is an important property, because they affect the Moment of Inertia (MOI) of the ball. The foamed outer cover of the golf ball of this invention may have a relatively low specific gravity. In one preferred embodiment, the outer cover layer has a relatively low specific gravity ("$SG_{outer\ cover}$"). For example, the outer cover layer may have a specific gravity within a range of about 0.30 to about 2.50. In one embodiment, the specific gravity is in the range of about 0.60 to about 2.00. In another embodiment, the specific gravity is in the range of about 0.90 to about 1.60. In yet another embodiment, the specific gravity is in the range of about 1.10 to about 1.40.

Meanwhile, the core layer may have a relatively high specific gravity ($SG_{outer}$) Thus, in one embodiment, the specific gravity of the inner core ($SG_{core}$) is greater than the specific gravity of the outer cover layer ($SG_{outer\ cover\ layer}$). For example, the outer cover layer may have a specific gravity within a range of about 0.50 to about 4.00. In one embodiment, the specific gravity is in the range of about 0.80 to about 3.00. In another embodiment, the specific gravity is in the range of about 1.20 to about 2.60. In yet another embodiment, the specific gravity is in the range of about 1.40 to about 2.10. In another example, the specific gravity of the inner core ($SG_{core}$) is less than the specific gravity of the outer cover layer ($SG_{outer\ cover\ layer}$).

In one preferred version, the foam composition contains mineral filler particulate. Suitable mineral filler particulates include compounds such as zinc oxide, limestone, silica, mica, barytes, lithopone, zinc sulfide, talc, calcium carbonate, magnesium carbonate, clays, powdered metals and alloys such as bismuth, brass, bronze, cobalt, copper, iron, nickel, tungsten, aluminum, tin, precipitated hydrated silica, fumed silica, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate. As discussed further below, the mineral fillers tend to help decrease the size of the foam cells and increase cell density. The fillers also tend to help improve the physical properties of the foam such as hardness, compression set, and tensile strength.

The surfaces of the mineral filler particulate may be chemically-modified to make the particulate compatible with a polymer matrix. This surface-treatment helps improve the blending and dispersion of the particulate in the polymer matrix as described further below. Suitable mineral filler particulate that may be used in the foam formulations include, but is not limited to, Garamite® mixed mineral thixotropes, commercially available from Southern Clay Products, Inc. It is believed the Garamite® mixed mineral thixotropes is a clay material comprising a mixture of different clay materials, particularly saponite clay materials which belong to the smectite family as described above and sepiolite clay, which is a hydrous magnesium silicate clay. Unlike many clays which are layered phyliosilicates as described above, sepiolite clay miner comprises tiny elongated, needle-like particles. The tiny elongated particles of sepiolite have an average length of 1 µm to 2 µm, a width of 0.01 µm; and contain open channels with dimensions of 3.6 Å×10.6 Å running along the axis of the particle.

The mineral filler included in the foam-forming mixture of the present invention is generally included in an amount of about 0.1 to about 60% by weight, preferably about 0.1% to about 9% by weight, and more preferably about 1% to about 5% by weight, based on total weight of the foam composition. In some embodiments, the composition may contain a substantial amount of filler, for example, greater than about 25% and even greater than about 50% by weight. More particularly, the mineral filler may be present in an amount of about 50 to about 60% by weight. In general, the mineral filler has an average particle size in the range of about 1 to about 25 microns, preferably about 1 to about 5 microns; however, particles having sub-micron particle sizes may be used in accordance with this invention as described further below. For example, nanometer-sized particles having a particle size of 1 to 100 nanometers (0.001 to 0.1 microns) may be used. The mineral filler particles, particularly the nanoclay particles, preferably have an average specific gravity within the range of about 1.3 to about 3.0 g/cc, more preferably in the range of about 1.4 to about 2.8 g/cc, particularly about 1.5 to about 2.0 g/cc.

Polyurethane foam compositions are unique materials. As discussed above, the foam-forming mixture contains various reactants including polyisocyanates, polyols, curing agents, surfactants, and catalysts. Special care should be taken when adding mineral fillers to a polyurethane foam-forming mixture, because the fillers can significantly affect the foam cells being generated, for example, cell growth and cell morphology. The fillers also can affect physical properties of the foam.

While not wishing to be bound by any theory, it is believed that adding the nanoclay particles to the foam composition helps improve the foam cell structure and morphology due to the interaction of the nanoclay and reactants in the foam mixture. As the nanoclay particles are introduced and dispersed in the foam mixture, they help create a greater number of smaller sized foam cells. The generated foam cells are packed together more tightly and cell density is increased. Also, the dimensions and geometry of the foam cells tends to be more uniform. The cell structure in the foam is maintained as the nanoclay particles help prevent gas from diffusing out through the cell walls. The resulting foam material tends to have greater compression strength and modulus. Also, the polyurethane foam containing the nanoclay particles tends to have faster cream time. That is, the foam rises quickly, particularly there is relatively short time period from the point of mixing the raw ingredients together to the point where the mixture turns cloudy in appearance or changes color and begins to rise from its initial stable state.

Dimple Patterns

As discussed above, the lower and upper mold cavities have interior dimple cavity details. When the mold cavities are mated together, they define an interior spherical cavity that forms the cover for the ball. As the mated molds travel through the curing tunnel, the cover materials begin to foam which increases cavity pressure. This growth is sufficient to pack out the dimples and produce a minimal amount of flash ring around the equator of the ball. The cover material encapsulates the inner ball subassembly to form a unitary, one-piece cover structure. Furthermore, the cover material conforms to the interior geometry of the mold cavities to form a dimple pattern on the surface of the ball. The mold cavities may have any suitable dimple arrangement such as, for example, icosahedral, octahedral, cube-octahedral, dipyramid, and the like. In addition, the dimples may be circular, oval, triangular, square, pentagonal, hexagonal, heptagonal, octagonal, and the like. Possible cross-sectional shapes include, but are not limited to, circular arc, truncated cone, flattened trapezoid, and profiles defined by a parabolic curve, ellipse, semi-spherical curve, saucer-shaped curve, sine or catenary curve, or conical curve. Other possible dimple designs include dimples within dimples, constant depth dimples, or multi-lobe dimples, as disclosed in U.S. Pat. No. 6,749,525. It also should be understood that more than one shape or type of dimple may be used on a single ball, if desired.

The use of various dimple patterns and profiles provides a relatively effective way to modify the aerodynamic characteristics of a golf ball. Suitable dimple patterns include, for example, icosahedron-based pattern, as described in U.S. Pat. No. 4,560,168; octahedral-based dimple patterns as described in U.S. Pat. No. 4,960,281; and tetrahedron-based patterns as described in co-assigned, co-pending, U.S. patent application Ser. No. 12/894,827, the disclosure of which is hereby incorporated by reference. Other tetrahedron-based dimple designs are shown in co-assigned, co-pending design applications D 29/362,123; D 29/362,124; D 29/362,125; and D 29/362,126, the disclosures of which are hereby incorporated by reference.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have dimple coverage of at least about 75 percent or greater, about 80 percent or greater, or even about 85 percent or greater.

In an alternative embodiment, the golf ball may have a non-planar parting line allowing for some of the plurality of dimples or projections to be disposed about the equator. In one embodiment, the upper and lower mold cavities each have non-planar parting surfaces and are staggered such that each surface comprises a plurality of peaks and valleys that constitute the staggered parting line's amplitude as described in the above-mentioned Nardacci et al., U.S. Pat.

No. 7,618,333, the disclosure of which is hereby incorporated by reference. In another embodiment, the parting line visibility is minimized by arranging the dimples in a pattern derived from at least one irregular domain generated from a regular or non-regular polyhedron as disclosed in co-assigned, co-pending U.S. patent application Ser. No. 12/262,464, the disclosure of which is hereby incorporated by reference. In another embodiment, a golf ball having multiple sets of identical hemispheres created by multiple symmetrical parting lines can be formed as disclosed in U.S. patent application Ser. No. 12/838,846, the disclosure of which is hereby incorporated by reference.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 300-360 dimples. In one embodiment, the dimple count on the ball is about 360-400 dimples.

In FIG. 5, a finished golf ball (38) having a dimpled outer cover (40) made in accordance with the present invention is shown. As discussed above, various patterns and geometric shapes of the dimples (40) can be used to modify the aerodynamic properties of the golf ball.

It should be understood the terms, "first", "second", "top", "bottom", "upper", "lower", and the like are arbitrary terms used to refer to one position of an element based on one perspective and should not be construed as limiting the scope of the invention.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

Test Methods

Hardness:

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used. Likewise, the midpoint of a core layer is taken at a point equidistant from the inner surface and outer surface of the layer to be measured, most typically an outer core layer. Once again, once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

The present invention is illustrated further by the following Examples, but these Examples should not be construed as limiting the scope of the invention.

EXAMPLES

The following prophetic examples describe foamed polyurethane covers for golf balls that can be made in accordance with this invention. The core and intermediate layers of the golf ball can be made from any suitable thermoset or thermoplastic composition. For example, a polybutadiene rubber composition can be used to make the inner core; and an ethylene acid copolymer ionomer composition can be used to make the intermediate layer. The foamed polyurethane cover can be made from any suitable composition as described above. One Example of a foamed polyurethane composition that can be used to make the foamed cover is described below in Table 1. A Comparative Example of a non-foamed polyurethane composition that can be used to make a comparative, non-foamed cover also is described below in Table 1. The concentrations of ingredients in the formulations of Table 1 are in weight percent, based on total weight of the composition, unless otherwise indicated.

For the foamed polyurethane cover, the materials used to prepare the foam are charged to the mold cavities. The temperature inside of the mold can vary, for example, the temperature can range from about Room Temperature (about 68° F.) to about 200° F. Steam, hot air, hot water, or radiant heat may be used to foam the composition. The pressure of the mold cavities is sufficiently maintained. The foamed composition expands in the mold cavities to form a foamed cover. This causes dimple pack-out and can reduce defects in the dimple profile of the cover. The amount of foaming is minimized so that the physical properties of the cover are maintained. The ball can then be cooled in the mold and removed when the molded cover layer is hard enough to be handled without deforming.

TABLE 1

| Sample Polyurethane Covers | | |
|---|---|---|
| | Example | |
| | Example 1 - Foamed Polyurethane Cover | Comparative A/Non-Foamed Polyurethane Cover |
| 6.5% MDI Prepolymer | 85.82% | 84.24% |
| Ethacure ™ 300 | 8.58% | 12.26% |
| White Dispersion | 3.50% | 3.50% |
| D.I. Water | 0.50% | 0.00% |
| Garamite ™ 1958 | 0.50% | 0.00% |
| Niax ™ 1500 | 1.00% | 0.00% |
| Dabco ™ 33LV | 0.10% | 0.00% |

6.5% MDI Prepolymer is made from 4,4'-MDI and polytetramethylene glycol ether

Ethacure™ 300—dimethylthiotoluenediamine (DMTDA), curing agent, available from Albemarle Corp. (Baton Rouge, La.)

Garamite™ 1958—mixed clay particulate, available from BYK-Chemie (Wesel, Germany).

Niax™ L-1500—silicone surfactant from Momentive Specialty Chemicals, Inc.

Dabco™ 33LV—tertiary amine catalyst, available from Air Products.

Figure 6:
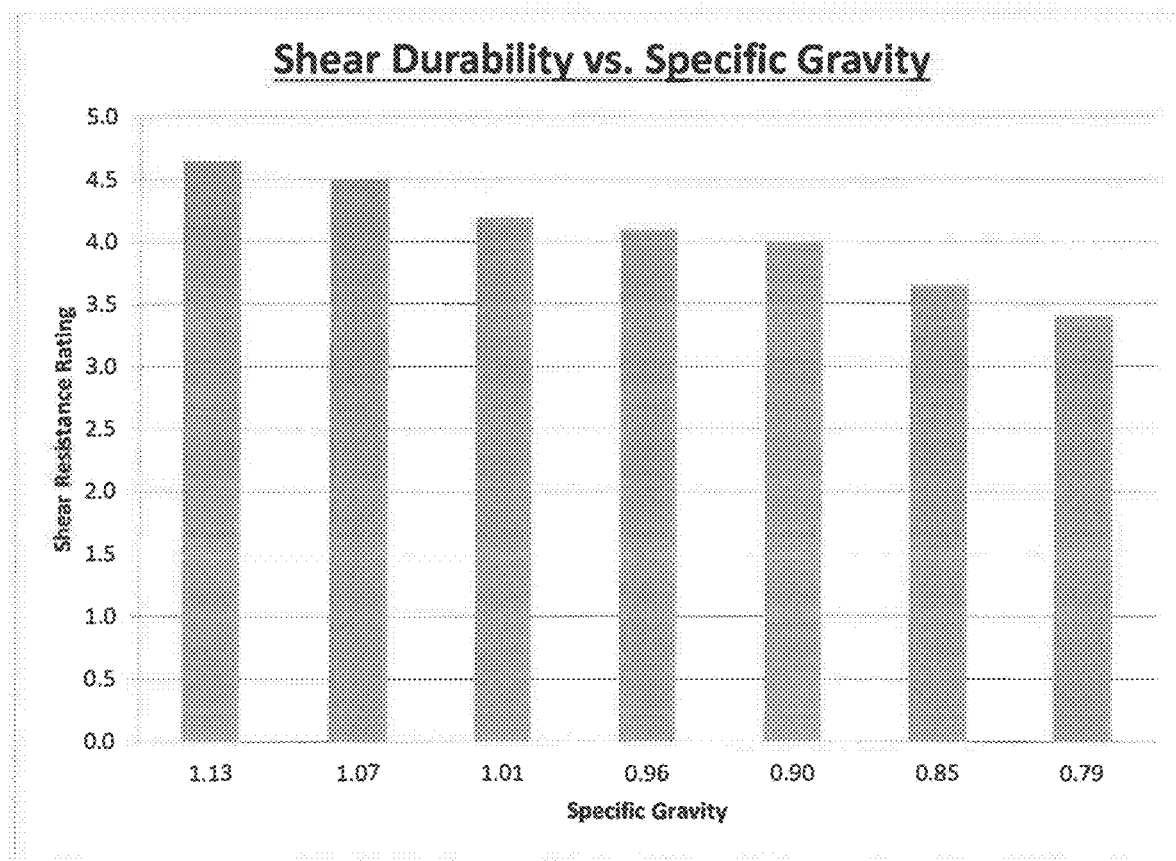
FIG. 6 is a graph showing the shear-durability of the ball cover plotted versus the specific gravity of the ball cover.

The methods of the present invention for producing a foamed golf ball cover provides many benefits and advantages over methods for producing conventional, non-foamed golf ball covers as shown in the following Tables 2-3 and FIG. 6 (Graph I).

For example, one advantage is that the foaming methods of this invention provide complete dimple packing-out in the mold cavities. The foamed polyurethane composition expands in the mold cavities to form a foamed cover. There are minimal or no surface defects on the foamed cover. In contrast, there are numerous defects on the non-foamed cover. The dimple packing-out foaming methods of this invention also reduce the need for post-curing of the foamed polyurethane cover. With conventional, non-foamed covers, it is often necessary to post-cure the cover composition. Also, surface defects can form in the cover due to temperature variations in: a) the cased core; and b) the mold cavities. More particularly, these temperature variations can cause surface defects such as flow lines, pin holes, and voids. The dimple packing-out methods of this invention help overcome some of the drawbacks that can occur when conventional molding methods are used.

Another advantage of the dimple packing-out foaming method of the present invention is that it can produce significant cost savings. As noted in below Table 2, the amount of material (Shot Weight) charged to the mold cavities is in the range of about 3.6 to about 5.2 grams; and the percent waste of material (for example, amount of flash produced) is in the range of about 5 to about 33%. However, as also shown in Table 2, even when the Shot Weight (weight of materials charged to the mold) is reduced in the present invention, there is still 100% dimple pack-out and there are zero surface defects on the ball. The shot size of the material charged to the mold can be volumetrically reduced up to about 50% per the foaming methods of the present invention. That is, the volume of the starting materials charged to the mold for producing the non-foamed polyurethane cover can be referred to as SM (Non-Foamed) and the volume of the starting materials charged to the mold for producing the foamed polyurethane cover can be referred to as SM (Foamed). The SM (Foamed) is preferably about 1 to about 50% less than SM (Non-Foamed) and more preferably about 3 to about 35% less and even more preferably about 5 to about 25% less. The polyurethane cover is slightly foamed and the specific gravity of the cover is reduced versus the specific gravity of the non-foamed cover using the foam molding method of this invention. Preferably, the amount of blowing (foaming) agent, for example, water, that is added to the composition is minimal. For example, the amount of blowing agent is in the amount of about 0.10 to 5.00% based on the weight of the composition. In one preferred example, the amount of blowing agent is in the range of about 0.25 to about 3.25%.

For example, the shot weight can be reduced from 5.2 grams to 4.9 grams. The polyurethane cover is slightly foamed and the specific gravity of the cover is reduced from 1.13 to 1.07 (5.3%). Although the polyurethane cover is foamed, there are no surface defects found on the cover, and the shear-durability value is greater than 4.0. In another example, the shot weight can be reduced from 5.2 grams to 4.4 grams. The polyurethane cover is slightly foamed and the specific gravity of the cover is reduced from 1.13 to 0.96 (15%). Although the polyurethane cover is foamed, there are no surface defects found on the cover, and the shear-durability value is greater than 4.0. That is, the specific gravity the non-foamed polyurethane cover can be referred to as SG (Non-Foamed) and the specific gravity of the foamed polyurethane cover can be referred to as SG (Foamed). The SG (Foamed) is preferably about 3 to about 35% less than SG (Non-Foamed) and more preferably about 5 to about 23% less.

Using a lesser amount of material to generate the foamed polyurethane cover in accordance with the present invention versus traditional non-foamed polyurethane cover molding methods can result in significant cost savings. Furthermore, there is less waste produced in the foam molding method of the present invention when the shot size of the cover material is reduced and yet there is still 100% dimple pack-out of the mold cavities.

TABLE 2

Example 1—Foamed Polyurethane Composition for Cover

| Shot Weight | Percent Waste of Material | Percent of Balls with Complete Dimple Packout—24 Ball Sample | Specific Gravity of Cover Material | Percent Reduction in Specific Gravity | Balls with Surface Defects | Shear-Durability Value |
|---|---|---|---|---|---|---|
| *5.2 grams | *33% | *100% | *1.13 | *N/A | *0 | *4.7 |
| 4.9 grams | 30% | 100% | 1.07 | 5.3% | 0 | 4.5 |
| 4.7 grams | 26% | 100% | 1.02 | 9.7% | 0 | 4.2 |
| 4.4 grams | 21% | 100% | 0.96 | 15% | 0 | 4.1 |
| 4.2 grams | 17% | 100% | 0.90 | 23% | 0 | 4.0 |
| 3.9 grams | 11% | 100% | 0.85 | 24.7% | 0 | 3.7 |
| 3.6 grams | 5% | 100% | 0.79 | 30% | 0 | 3.4 |

*N/A—In this example, a foamable composition was charged to the mold for making a foamed polyurethane cover. However, because the flash ring was full, the composition showed little or no evidence of foaming. There was little space for the foaming to occur.

TABLE 3

Comparative Example A—Non-Foamed Polyurethane Composition for Cover

| Shot Weight | Percent Waste of Material | Percent of Balls with Complete Dimple Packout—24 Ball Sample | Specific Gravity of Cover Material | Balls with Surface Defects | Shear-Durability Value |
|---|---|---|---|---|---|
| 5.2 grams | 33% | 100% | 1.13 | 0 | 4.7 |
| 4.9 grams | 30% | 100% | 1.13 | 0 | 4.7 |
| 4.7 grams | 26% | 100% | 1.13 | 0 | 4.7 |
| 4.4 grams | 21% | 83% | 1.13 | 2 | **N/A |
| 4.2 grams | 17% | 58% | 1.13 | 5 | **N/A |
| 3.9 grams | 11% | 33% | 1.13 | 8 | **N/A |
| 3.6 grams | 5% | 8% | 1.13 | 11 | **N/A |

**N/A—Balls with surface defects were not tested for shear-durability.

Another advantage is that that the methods of this invention provide balls having foamed polyurethane covers with high shear-durability as shown in above Table 2. That is, the balls having the foamed polyurethane covers of this invention have good shear-resistance even when the specific gravity of the covers is relatively low as shown in FIG. 6 (Graph I). In this Graph 1, the shear-durability of the ball cover is plotted versus the specific-gravity of the ball cover. Preferably, the shear-durability value of the foamed polyurethane cover of this invention is 4.0 or greater, and the cover has a specific gravity in the range of about 0.90 to about 1.20. In one particularly preferred range, the foamed polyurethane cover has a specific gravity in the range of about 0.95 to about 1.15. In an even more preferred range, the foamed polyurethane cover has a specific gravity in the range of about 1.00 to about 1.10. The shear-durability of the balls was evaluated according to the following test method.

Shear-Durability:

A Vokey SM7" golf club was used to strike a set of sample golf balls at a club head speed of about 100 mph. The balls were struck so they made impact with an angled steel plate—the balls then rebounded off the plate. Each set contained twelve (12) golf balls. Each given set of balls were then visually inspected with the naked eye to determine the wear and tear on the balls. The balls were visually inspected to determine if there were any cracks, fissures, splits, nicks, scuff marks, and/or other damage on their cover surface. The set of balls were then assigned an average shear-durability rating based on the visual damage to the balls. The following Shear-Durability scale was used:

Shear-Durability Rating
5—Excellent shear-durability
4—Good shear-durability
3—Fair shear-durability
2—Poor shear-durability
1—Deficient shear-durability It also should be understood that the methods and golf ball products described and illustrated herein represent only presently preferred embodiments of the invention. It is appreciated by those skilled in the art that various changes and additions can be made to such methods and products without departing from the spirit and scope of this invention. It is intended that all such embodiments be covered by the appended claims.

We claim:
1. A method for forming a cover layer for a golf ball, comprising the steps of:
 i) providing a spherical core having at least one layer;

ii) providing an upper and lower mold cavity, each mold cavity having an arcuate inner surface defining an inverted dimple pattern;

iii) introducing a polyurethane composition comprising a foaming agent into at least one mold cavity and loading the core into a mold cavity;

iv) joining the mold cavities together under compressive force and heating the polyurethane composition so that the foaming agent is activated and foaming of the composition is initiated and a spherical foamed polyurethane cover layer is formed over the core; and v) detaching the mold cavities and removing the golf ball, the foamed polyurethane cover of the golf ball having a specific gravity in the range of about 0.90 to about 1.20 and a Shear Durability Rating of 4.00 or greater.

2. The method of claim 1, wherein the foaming agent is water.

3. The method of claim 1, wherein the foamed polyurethane composition is prepared by adding water to a mixture of polyisocyanate, polyol, and curing agent compounds, the water being added in a sufficient amount to cause the mixture to foam.

4. The method of claim 1, wherein the polyurethane composition further comprises a catalyst.

5. The method of claim 1, wherein the foamed polyurethane composition further comprises clay particulate.

6. The method of claim 5, wherein the clay particulate comprises a mixture of different clay particles, the particles having an average specific gravity in the range of about 1.30 to about 3.00 g/cc.

7. The method of claim 5, wherein the clay particulate has a chemically-modified surface, the surface being chemically-modified with a compound selected from the group consisting of ammonium compounds, protonated amines, organic phosphonium ions, and/or aminocarboxylic acids.

8. The method of claim 1, wherein the outer cover has a Shore D outer surface hardness in the range of about 15 to about 60.

9. The method of claim 1, wherein the core is single-layered and comprises a polybutadiene rubber composition.

10. The method of claim 1, wherein the outer cover layer has a specific gravity in the range of about 0.95 to about 1.15.

* * * * *